Patented June 11, 1946

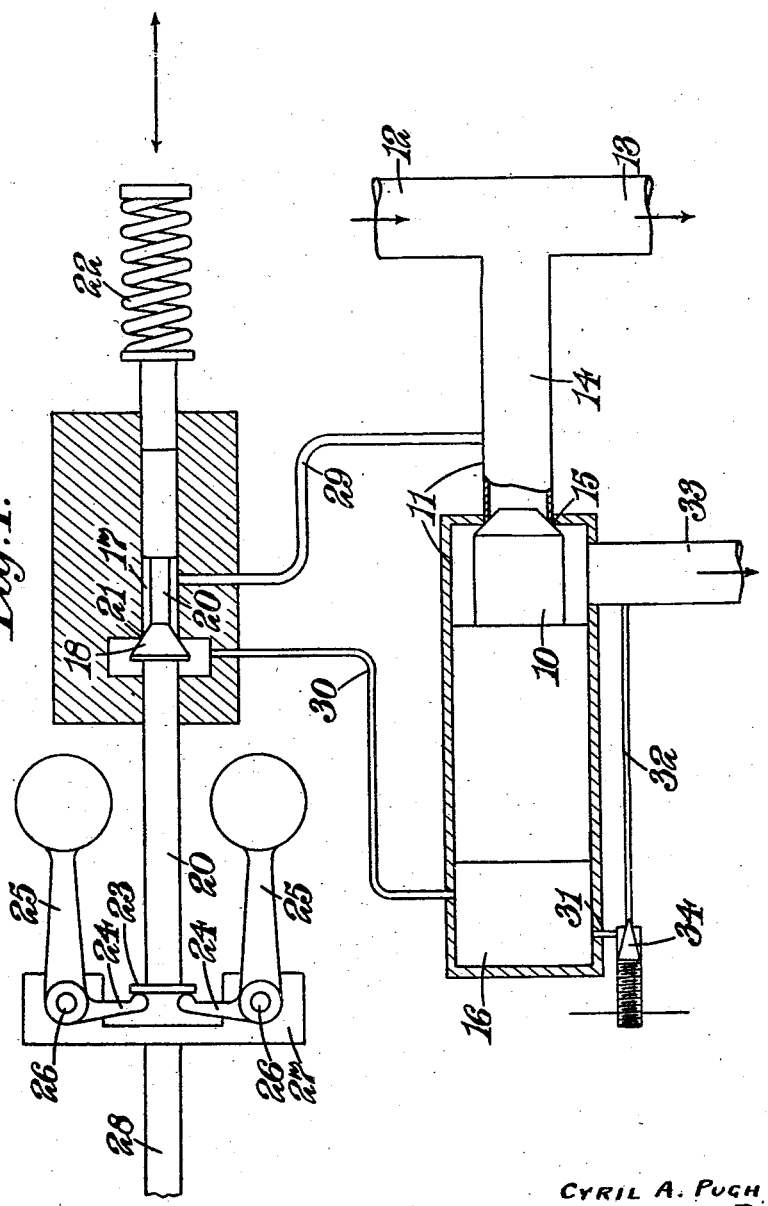

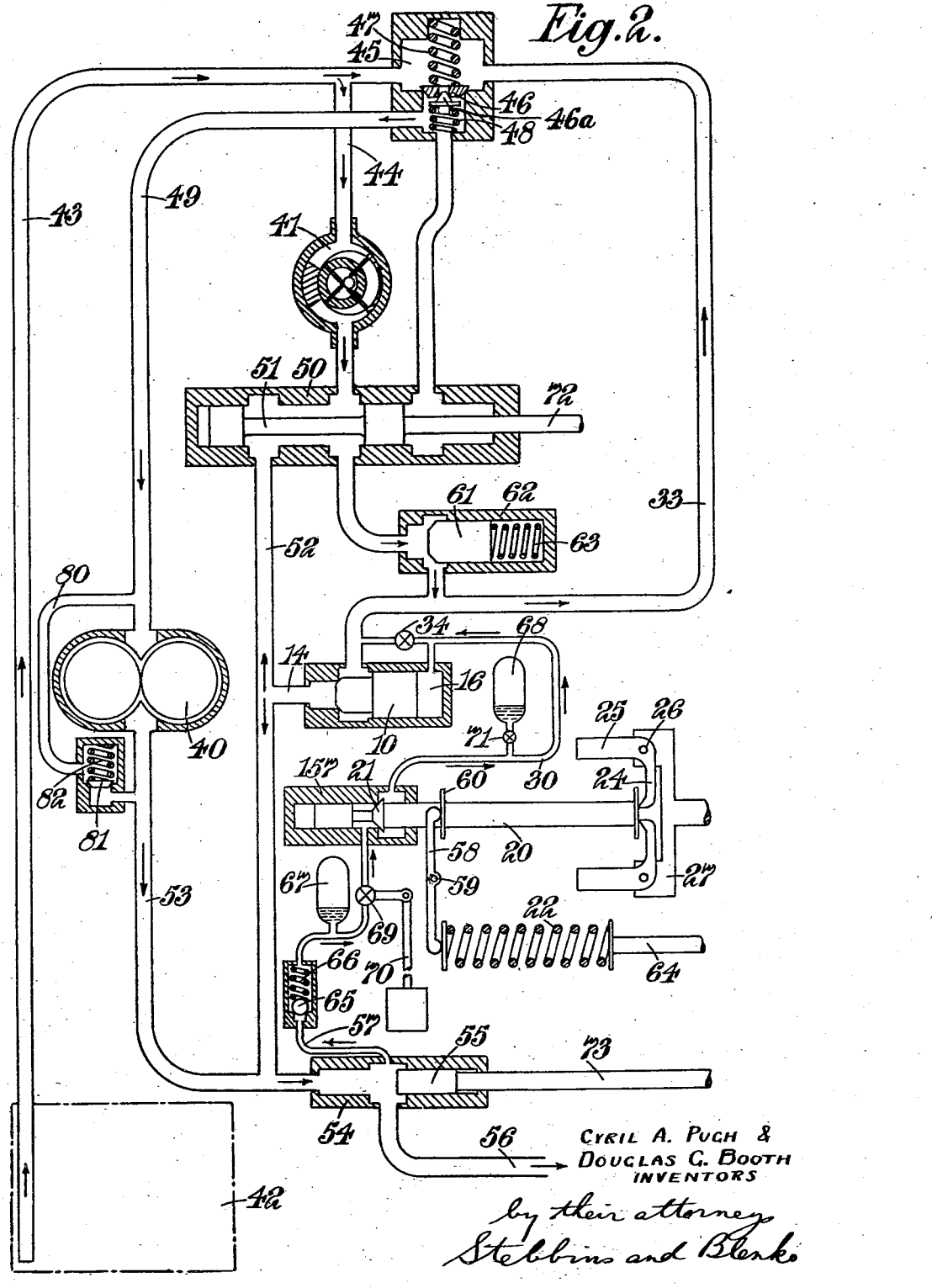

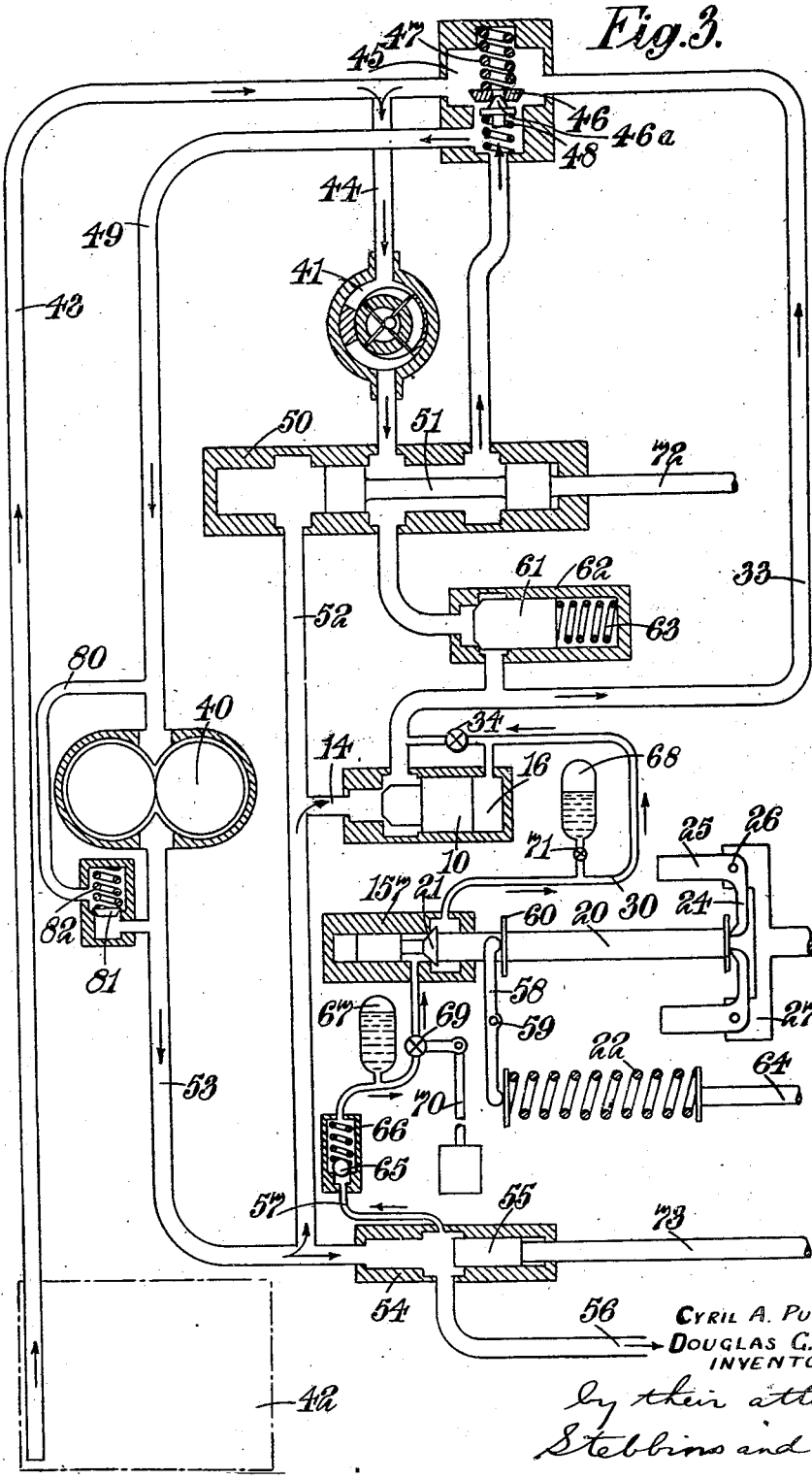

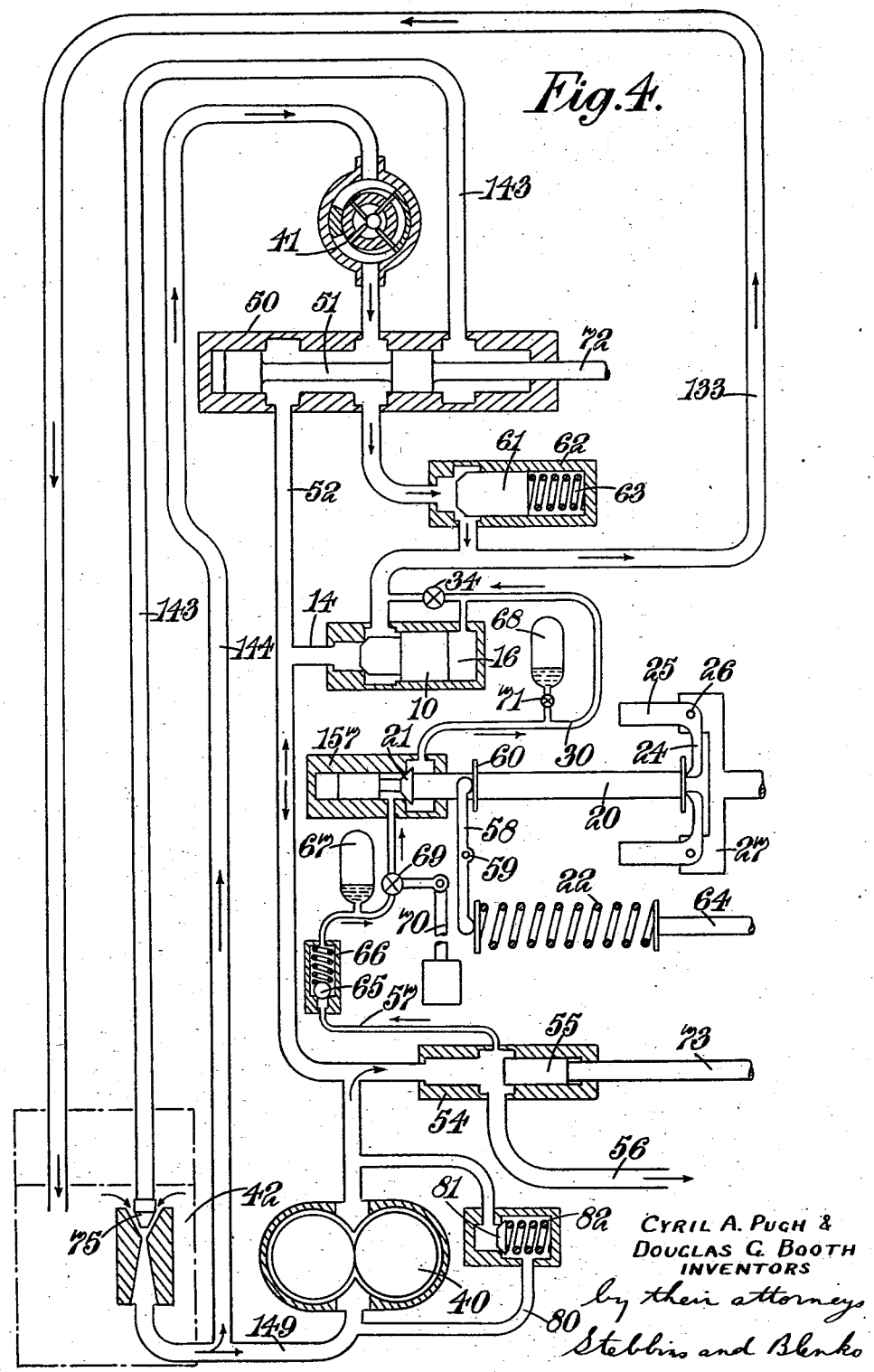

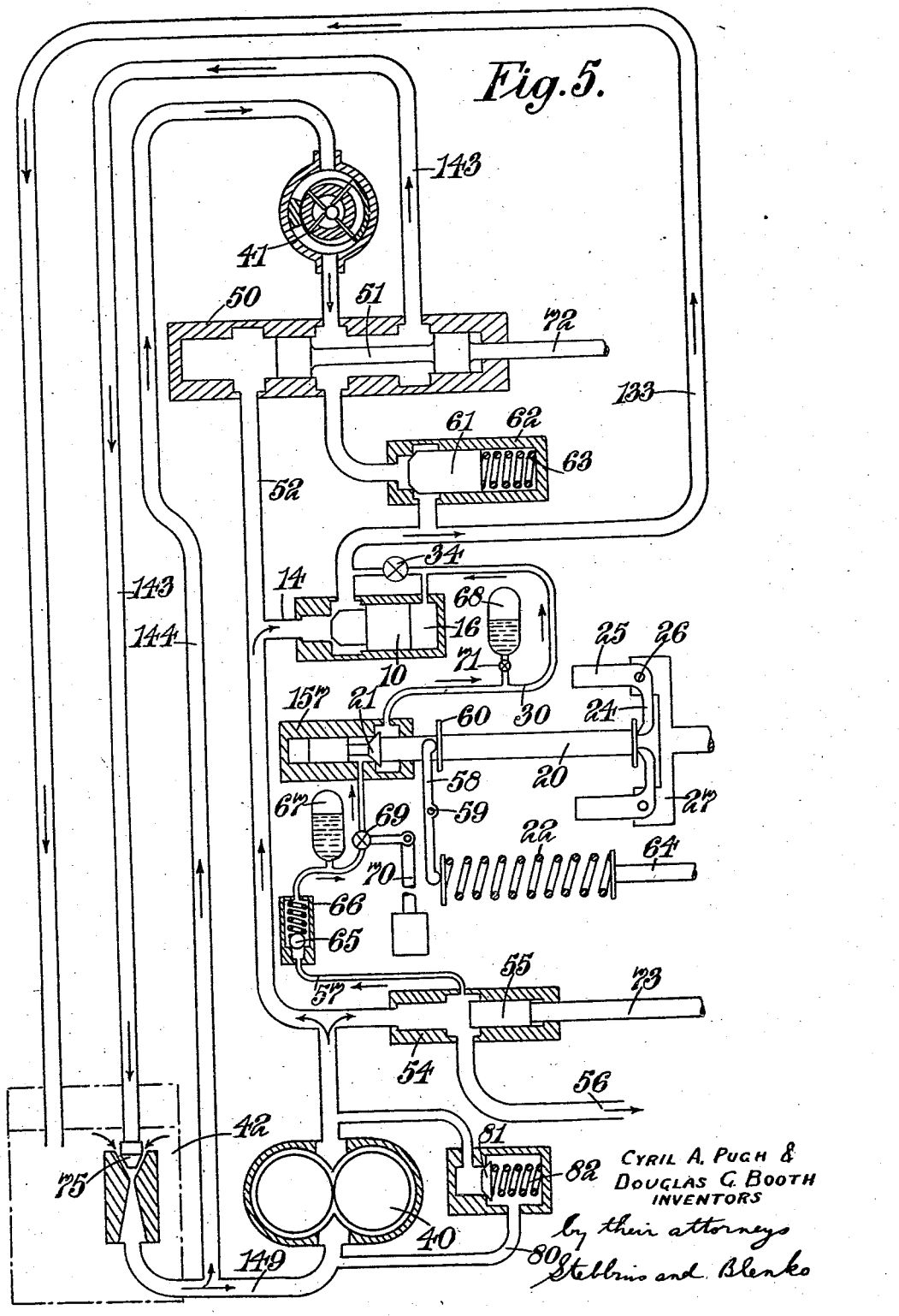

2,401,883

UNITED STATES PATENT OFFICE 2,401,883

FUEL SUPPLY SYSTEM FOR INTERNAL-COMBUSTION ENGINES OR OTHER FUEL-CONSUMING MEANS

Cyril Alphonso Pugh and Douglas Gerhard Booth, Ilford, England, assignors to The Plessey Company Limited, Ilford, Essex, England, a company of Great Britain Application November 11, 1942, Serial No. 465,220
In Great Britain May 19, 1941

14 Claims. (Cl. 103—11)

This invention consists in improvements in or relating to fuel-supply systems for internal-combustion engines or other fuel-consuming means used more especially in aircraft, all such means being included, in the description which follows, by the general term "engine."

An object of the present invention is to provide an apparatus which will ensure an adequate fuel supply, even at high rates of consumption, when low surrounding atmospheric pressure may tend to cause vaporisation of the fuel and to reduce the efficiency of a conventional fuel-supply system.

A further object of the invention is to provide valve means which will secure the possibility of obtaining high fuel flow at low engine speed, for starting purposes.

Yet another object of the invention, in one form thereof, is the provision of valve means automatically to control the fuel delivery to the engine for the purpose of maintaining engine speed constant.

According to the present invention fuel-supply apparatus comprises in combination a main fuel pump having its inlet connected to a fuel tank and its outlet serving to deliver fuel under pressure to an engine, a second pump also having its inlet connected to the fuel tank, means controlling the delivery of this second pump to boost the pressure at the inlet of the main pump or at the inlets of both pumps and for alternatively directing the flow of both pumps when desired to the engine.

In order that the invention may be more clearly understood some preferred examples will now be described with the aid of the accompanying drawings, in which Figure 1 is a schematic layout of governor-controlled by-pass valves operating in a fuel supply system, Figures 2 and 3 illustrate another schematic layout of a complete fuel supply system embodying main and secondary pumps showing respectively the operation of the system under starting and under running conditions, and Figures 4 and 5 represent a modified schematic layout in views respectively similar to Figures 2 and 3, but showing a means for boosting the pump inlets.

Like reference numerals indicate like parts in the several figures of the drawings.

Referring first of all to Figure 1, the by-pass or control valve 10 comprises a valve casing 11 having an inlet 12 for connection to the supply of fuel under pressure to the engine and an outlet 13 leading to the engine. The fuel may be supplied under pressure in a manner to be described later in connection with Figures 2 to 5. The inlet to the valve casing leads directly to the main control port 14 which opens as a branch passage from the combined conduit 12, 13.

Axially in line with the control port 14 is a valve seating 15 for the valve 10 and behind this seating the bore of the valve casing increases in diameter and the valve body is correspondingly increased so as to be a free sliding fit in the enlarged bore enabling the valve to float on a film of the fluid, such as liquid fuel which it controls and thus operate with the minimum of friction. The head of the valve 10 facing port 14 is exposed to the pressure of fuel entering conduit 12 and constitutes a valve opening pressure face, whereas the opposite end of the valve constitutes a valve closing pressure face exposed to a chamber 16 constituted by the opposite end of the valve casing. This chamber may be considered as a control chamber.

Parallel with the valve chamber 11 is a smaller bore 17 in which slides an auxiliary or governing valve 18 the stem 20 of which is extended in one direction beyond a valve seating 21 to be controlled by a spring 22 tending to open the valve, whereas in the opposite direction the stem 20 is provided with a pressure plate 23 to be engaged by bellcrank arms 24 of a centrifugal governor whose other arms are indicated at 25. The bellcranks 24, 25 are each pivoted at 26 in a disc 27 mounted to rotate with a rotor shaft 28 driven from the engine or a selected moving member of the apparatus which it is desired to control.

A passage 29 leads from the pressure side of the main or by-pass valve 10, that is to say, from port 14, to one side of the governing valve seating 21 and a second passage 30 leads from the other side of the valve seating to the control chamber 16. In the side of the control chamber there is also an escape port 31 which opens into a passage 32 leading to an outlet 33 from the low pressure side of valve casing 11 and leads back either to the tank from which the fluid is supplied or to the suction side of a pressure chamber which supplies the conduit 12. Passages 31, 32 form a leak from the control chamber 16 and the passage 32 is controlled by an adjustable needle valve 34.

The purpose of the apparatus as applied to an internal-combustion engine is to regulate the fuel supply to maintain a constant engine speed. The centrifugal governor 24, 25, 26, 27, is balanced against the control spring 22 and any variation of the balance causes valve 18 to move. These parts are so arranged that an increase in speed moves the valve towards the closed position and vice versa.

The centrifugal governor and its spring 22 are set for a predetermined speed at which the governing or pilot valve 18 will be floating at a small distance from its seat thereby permitting sufficient fluid to pass into control chamber 16 to maintain a pressure in that chamber which will give a seating to valve 10 for a correct flow or pressure of fuel through conduit 12, 13. By adjusting the needle valve 34 it is possible to vary the bleed from chamber 16 and thus the position of valve 18 relatively to its seat thereby adjusting the rate at which the pressure is charged on the face of the valve 10 presented to the chamber 16 when the pilot valve 18 moves to or from its seat under the influence of the governor. By this means the valve 18 can be adjusted to its most sensitive position so that valve 10 will move to or from its seat to maintain a fluid pressure through the conduit 12, 13 to sustain the engine speed and any fluctuation in the speed of the engine will vary this pressure accordingly. In fact, the slightest variation in engine speed would have the effect of by-passing more or less fluid from the conduit 12, 13 to the passage 33 and the valve 10 therefore maintains a balance on its two pressure faces which effects the very delicate control of the flow of fluid through the conduit 12, 13.

In the supply system illustrated in Figures 2 and 3, a main fuel pump 40 and a secondary fuel pump 41, both of the positive displacement type, are intended to draw fuel from a tank 42 through pipe 43. A branch from this pipe indicated at 44 passes direct to the inlet of the secondary pump 41 the pipe itself continuing to a valve chamber 45 in which is a downwardly seating valve 46 normally maintained on its seat by a spring 47 and opposed to a lighter spring 48 pressing against a non-return valve 46A on the opposite side of the valve. The non-return valve 46A within the valve 46 permits fuel to flow from valve chamber 45 to another pipe 49 leading to the inlet of the main pump 40.

The outlet from the secondary pump opens into a valve chamber 50 in which is located a starting valve 51 of dumbbell form and an outlet pipe 52 leads from the valve casing 50 and joins another pipe 53 leading from the outlet of the main pump 40, the outputs of pipes 52 and 53 entering a casing 54 of a shut-off valve 55.

From the valve casing 54 a conduit 56 leads to the engine and corresponds to conduit 13 of Figure 1 and another conduit 57 also connects the valve casing 54 with a valve casing 157 containing valve 21 corresponding to the similarly numbered valve in Figure 1. An outlet passage 30 leads from the opposite side of a valve 21 to a control chamber 16 of a valve 10 and an adjustable leak 34 connects the control chamber 16 with a return pipe 33 leading back to the suction sides of the main and secondary pumps. It will be appreciated that all the elements 21, 30, 16, 10, 34, and 33, and branch passage 14 are the counterparts of the similarly numbered elements in Figure 1 as are also the governor parts 20, 24, 25, 26, 27 and control spring 22. In this case a lever 58 pivotally mounted at 59 serves as the interconnection between valve stem 20 via a flange 60 and control spring 22 as will be readily understood from the drawings.

By means of the system so far described it is possible, in the case of an internal-combustion engine, to maintain a supply of fuel to the engine to hold a preselected speed constant. In the running condition illustrated in Figure 3, when the valve 51 is in the normal position as shown, and the valve 55 is fully opened, fuel is drawn through the suction line by the secondary fuel pump 41 and passed through the starting valve 51 thence via the pressure control valve 46 to boost the suction side of the main fuel pump 40. The valve 46 controls the delivery pressure of the secondary fuel pump and this pressure is insufficient to open a starting pressure control valve 61 contained in the valve casing 62 and urged by a spring 63 against the pressure in the line produced by pump 41. Valve 61 controls the passage of fuel from pump 41 to the return line 33. Fuel raised by the main fuel pump 40 to the pressure required by the engine passes to the latter via the shut-off valve 55, any excess fuel being passed prior to valve 55 to the low pressure side of valve 10 through pipe 52 and valve 10 controls pressure of delivery to the engine in the manner already described in connection with Figure 1.

Assuming the engine to be running at a speed preselected by the setting of spring 22 by means of its control rod 64, the governor 24, 25, 26 will then be running at this preselected speed and will be balanced against the loading spring 22. Valve 21 is in complete hydraulic balance by reason of the constructional form of the valve as illustrated and consequently fluid pressure within the valve chamber does not affect the balance of the governor and spring 22.

One side of valve 21 is supplied with fluid taken from the engine delivery line through pipe 57. The other side of valve 21 is connected to chamber 16 of the differential by-pass valve 10 and to a low pressure portion of the circuit via adjustable restriction 34. Any increase in engine speed will therefore cause pilot valve 21 to move towards its closed position to decrease the pressure in control chamber 16 of valve 10 and will then allow a greater amount of fuel to by-pass from conduit 14 to conduit 33 and thus cause the engine speed to fall due to the smaller amount of fluid supplied. A decrease in engine speed will have the opposite effect.

The response of valves 21 and 10 to any change in engine speed is found to be so rapid and delicate that for all practical purposes the system maintains a constant engine speed with only immaterial and almost inappreciable fluctuations.

In the system illustrated, in the conduit 57 there is a non-return valve 65 urged towards its seat by a spring 66 and, furthermore, there are branched from this conduit and also from conduit 30 air bottles 67 and 68 respectively tending to damp out fluctuations of pressures in the two conduits from which they are branched.

Other devices may be employed in the same system for controlling engine speed with respect to other external conditions such, for instance, as temperature changes. Each of these devices can take the form of the pilot valve 21 and instead of the governor 24, 25, 26 for controlling the valve other pressure applying devices depending upon conditions to be accommodated will serve to act upon the valve. For instance, in the case of adjustment for temperature changes a temperature-responsive movable arm or arms will act upon the additional valve in a manner which will be readily appreciated and such additional valve or valves will be inserted in sequence in line 57 at a position indicated diagrammatically at 69. Crank arm 70 is included in the drawings also diagrammatically to illustrate the control member associated with the additional valve. There may be two or more such valves in series in line 57 according to the conditions under which it is desired to control the engine speed.

When air bottles or accumulators such as 67 and 68 are employed it will be found advisable, and generally necessary in the case of air bottle 68, to include a restricting valve 71.

For starting the engine, valve 55, as shown in Figure 2, is fully open, control member 64 is adjusted to the minimum speed position, and valve 51 is depressed by its control rod 72 so as to open the delivery of pump 41 to conduit 52 and to close the delivery of that pump to valve 46. Control 72 for valve 51 may be utilised to operate a starter motor and also to actuate the ignition switch when valve 51 is moved into the starting position shown in Figure 2.

Valve 51 combines the deliveries of the main and secondary fuel pumps so that their total delivery is available to the engine for starting and the pressure of this delivery being determined by the starting pressure control valve 61, the starting speed is thereby controlled. After starting, the valve 51 is moved to the running position so as to open the delivery of pump 41 to valve 46 and conduit 49 and the speed of the engine will then rise to that set by adjustment of control spring 22. At starting fuel is drawn from the tank through a pipe 43, which is common to both pumps, the secondary fuel pump 41 taking its supply directly from this line, and the main fuel pump 40 taking its supply via the non-return valve 46A incorporated in pressure control valve 46. The delivery pressure which is applied to control chamber 16 through what may be termed the servo circuit, i. e. the equivalent of the circuit illustrated in Figure 1, past the now open valve 21, is such as to hold valve 10 in the closed or substantially closed position, and when the engine has run up to speed, valve 21 will be moved to its closed position to effect the speed control as previously described. To shut down the engine the control 64 is moved to the minimum running position and valve 55 by means of its control member 73 is depressed to a position which entirely cuts off the supply to conduits 56 and 57. In the event of damage to or failure of the governor valve 55 may be used as a manual speed control and may optionally be utilised as an emergency control to completely isolate the engine from all further supply of fuel by closing valve 55 completely in whatever position the control 64 may be. At the same time by so doing the supply of fuel to the servo unit through conduit 57 will also be stopped and will cause the pressure of the whole system to fall to zero.

Alternatively, as shown in Figures 4 and 5, the circuit is substantially the same as that already described with the exception that in place of valve 46 and its connections with conduits 43, 44, 49 and 33, this valve is completely omitted and both pumps draw their supply of fuel from tank 42 by separate conduits. In the running condition the outlet from the secondary pump 41 is passed through a conduit 143 to a suction boost pump of the injector type 75 for boosting the pressure of fuel supply to conduit 149 which leads to the inlet of both main pump 40 and secondary pump 41. Any other form of suction boosting device operated by the fluid may be employed, if preferred. As will be seen by an examination of Figures 4 and 5, whereas under running conditions conduit 143 connects the outlet of pump 41 to the pressure boosting means 75, in the starting position shown in Figure 4 this pipe 143 is cut out of use entirely and both pumps draw their supplies of fuel directly from the tank, that for the secondary pump being taken through conduit 144, and that for the main pump through conduit 149.

With the arrangement shown in Figures 4 and 5, it will be seen that the fuel by-passed by valves 10 and 61 is passed by a line 133 back to the tank or, alternatively, into a line connecting the two engine-driven pumps 40 and 41 with the suction boost pump 75.

In the fuel supply passage illustrated in Figures 2 and 3 it may be found desirable to provide a by-pass passage 80 controlled by a valve 81 urged on to its seat by a spring 82. The purpose of this valve is to afford a by-pass of the circulation of fuel from the main pump should by any chance the flow through conduit 53 become obstructed or unduly restricted for any reason whatsoever. A similar by-pass passage 80, valve 81 and spring 82 is shown in a corresponding position in the circuit according to Figures 4 and 5.

While fuel supply systems illustrated in Figures 2 and 5 are particularly designed and adapted for the supply of liquid fuel to internal-combustion engines and other fuel-consuming means, the servo control portion of the system which is illustrated by itself in Figure 1 can be utilised for controlling the rate of flow of liquid in other systems not necessarily fuel supply systems.

We claim:

1. For an engine consuming liquid fuel, fuel supply apparatus comprising in combination a tank holding a supply of fuel, a conduit comprising a connection through which fuel may pass to an engine, a main fuel pump, a conduit connecting the pump inlet with the tank, another conduit connecting the pump outlet with said connection, a second pump having a conduit connecting its inlet with the tank, a valve casing, other conduits communicating with and connecting said valve casing to the outlet of the second pump, to the inlet of the main pump, and to said connection respectively, valve means within said valve casing controlling the flow of fluid through said casing and said three last-mentioned conduits whereby the outlet from the second pump can be alternatively placed in communication, through said valve casing, with the inlet to the main pump and with said connection.

2. For an engine consuming liquid fuel, fuel supply apparatus comprising in combination a tank holding a supply of fuel, a conduit comprising a connection through which fuel may pass to an engine, a main fuel pump, a conduit connecting the pump inlet with the tank, another conduit connecting the pump outlet and said connection, a second pump having a conduit connecting its inlet with the tank, and booster means including a conduit for delivering fuel from the outlet of the second pump to the inlets of both pumps, and other conduits communicating respectively with the outlet of the second pump, and with said connection, and valve means including a valve casing with which said last three mentioned conduits communicate and a valve within the casing controlling the flow of fluid through said last three named conduits and through said valve casing whereby the outlet from the fuel pump can be alternatively placed in communication with the booster means and with said connection.

3. Fuel supply apparatus according to claim 1 in combination with an engine driven speed sensitive device, speed responsive valve means for controlling the flow of fuel delivered to said connection and valve actuating means positively connecting said valve means to the speed sensitive device.

4. Fuel supply apparatus according to claim 2 in combination with an engine driven speed sensitive device, speed responsive valve means controlling the flow of fuel delivery to said connection, and valve actuating means operatively connecting said valve means to the speed sensitive device.

5. For an engine consuming liquid fuel, fuel supply apparatus comprising in combination a tank holding a supply of fuel, a conduit comprising a connection through which fuel may pass to an engine, a main fuel pump, a conduit connecting the pump inlet with the tank, another conduit connecting the pump outlet with said connection, a second pump having a conduit connecting its inlet with the tank, valve means comprising a valve and valve casing, a conduit connecting the valve casing with the outlet from the second pump, and other conduits connecting the valve casing with the inlet to the main pump and with said connection respectively, said valve being movable within the casing to one position in which the outlet of the fuel pump will be in fluid flow communication through the valve casing with the inlet of the main pump, and movable to another position in which the outlet of the second pump will be in fluid flow communication through said valve casing with said connection.

6. For an engine consuming liquid fuel, fuel supply apparatus comprising in combination a tank holding a supply of fuel, a conduit comprising a connection through which fuel may pass to an engine, a main fuel pump, a conduit connecting the pump inlet with the tank, another conduit connecting the pump outlet and said connection, a second pump having a conduit connecting its inlet with the tank, and booster means including a conduit for delivering fuel from the outlet of the second pump to the inlets of both pumps, and other conduits communicating respectively with the outlet of the second pump, and with said connection, and valve means including a valve casing with which said last three mentioned conduits communicate and a valve within the casing controlling the flow of fluid through said last three named conduits and through said valve casing whereby the outlet from the fuel pump can be alternatively placed in communication with the booster means and with said connection, fuel by-pass means including a conduit connected at one end to the conduit extending between the valve casing and said connection and having its opposite end in fluid flow communication with said tank, valve means within said by-pass conduit, an engine driven speed sensitive device, and valve actuating means operatively connecting said valve means and said speed sensitive device for varying the quantity of by-passed fuel flowing through said by-pass conduit.

7. Fuel-supply apparatus according to claim 2, in which the means to boost the pressure at the inlet of the main pump comprises an auxiliary pump situated at the level of the fuel-tank.

8. Fuel-supply apparatus according to claim 2, in which the means to boost the pressure at the inlets of both pumps comprises an auxiliary pump situated at the level of the fuel-tank.

9. Fuel-supply apparatus according to claim 2 in which the means to boost the pressure at the inlet of the main pump comprises an auxiliary pump submerged within the fuel tank.

10. Fuel-supply apparatus according to claim 2 in which the means to boost the pressure at the inlets of both pumps comprises an auxiliary pump submerged within the fuel tank.

11. Fuel-supply apparatus according to claim 2 in which the means to boost the pressure at the inlet of the main pump comprises an auxiliary pump which is submerged within the fuel tank and which is in the form of an injector pump to the nozzle of which delivery from the second pump is applied.

12. Fuel-supply apparatus according to claim 2 in which the means to boost the pressure at the inlets of both pumps comprises an auxiliary pump which is submerged within the fuel tank and which is in the form of an injector pump to the nozzle of which delivery from the second pump is applied.

13. In a fuel-supply system, the combination with a main fuel pump having its inlet connected to a fuel tank and its outlet connected to deliver fuel under pressure to an engine, a second pump also having its inlet connected to the fuel tank, and means selectively controlling delivery of this second pump so as to boost the pressure at the inlet of the main pump or deliver its output with that of the main pump when desired to the engine, of means for regulating the flow of fuel from the pumps to the engine comprising a control valve casing connected in a branch passage from the outlet connection of the main pump to the tank, a control valve in said casing which obturates said branch passage and has a valve-opening pressure face which is subject to the pressure of liquid in the branch passage, a by-pass passage also leading from the high pressure side of the valve casing to a region of relatively low pressure, a control chamber connected in said by-pass passage, said valve also having pressure face which is of larger area than that of the valve-opening pressure face and is subject to pressure of liquid in said control chamber, two leaks in said by-pass passage one situated on the upstream side and one on the downstream side of the control chamber, and variable actuating means for automatically adjusting one of the leaks, said means being external to and independent of the pressure of liquid flowing from the main pump to the engine.

14. In a fuel-supply system, the combination with a main fuel pump having its inlet connected to a fuel tank and its outlet connected to deliver fuel under pressure to an engine, a second pump also having its inlet connected to the fuel tank, and means selectively controlling delivery of this second pump so as to boost the pressure of the inlets of both pumps or deliver the combined flow of both pumps when desired to the engine, of means for regulating the flow of fuel from the pumps to the engine comprising a control valve casing connected in a branch passage from the outlet connection of the main pump to the tank, a control valve in said casing which obturates said branch passage and has a valve-opening pressure face which is subject to the pressure of liquid in the branch passage, a by-pass passage also leading from the high pressure side of the valve casing to a region of relatively low pressure, a control chamber connected in said by-pass passage, said valve also having pressure face which is of larger area than that of the valve-opening pressure face and is subject to pressure of liquid in said control chamber, two leaks in said by-pass passage one situated on the upstream side and one on the downstream side of the control chamber, and variable actuating means for automatically adjusting one of the leaks, said means being external to and independent of the pressure of liquid flowing from the main pump to the engine.

CYRIL ALPHONSO PUGH.
DOUGLAS GERHARD BOOTH.